United States Patent
Kobayashi

(10) Patent No.: US 8,172,962 B2
(45) Date of Patent: May 8, 2012

(54) FIXED CONSTANT VELOCITY UNIVERSAL JOINT AND METHOD FOR MANUFACTURING OUTER RACE THEREOF

(75) Inventor: Tomoshige Kobayashi, Iwata (JP)

(73) Assignee: NTN Corporation, Osaka (JP)

(*) Notice: Subject to any disclaimer, the term of this patent is extended or adjusted under 35 U.S.C. 154(b) by 288 days.

(21) Appl. No.: 12/602,197

(22) PCT Filed: May 29, 2008

(86) PCT No.: PCT/JP2008/059922
§ 371 (c)(1),
(2), (4) Date: Nov. 30, 2009

(87) PCT Pub. No.: WO2008/149775
PCT Pub. Date: Dec. 11, 2008

(65) Prior Publication Data
US 2010/0173714 A1 Jul. 8, 2010

(30) Foreign Application Priority Data

Jun. 4, 2007 (JP) .................. 2007-148343
Jun. 8, 2007 (JP) .................. 2007-152807

(51) Int. Cl.
*C21D 8/10* (2006.01)

(52) U.S. Cl. ............ 148/649; 72/714; 464/906

(58) Field of Classification Search .......... 464/145, 464/902, 906; 148/320, 326, 649; 72/714, 72/352

See application file for complete search history.

(56) References Cited

U.S. PATENT DOCUMENTS

| 5,803,993 A | 9/1998 | Yoshida et al. |
| 6,390,924 B1 * | 5/2002 | Yoshida et al. ............... 464/902 |

FOREIGN PATENT DOCUMENTS

| JP | 04-104418 | 4/1992 |
| JP | 04-194418 | 7/1992 |
| JP | 9-280262 | 10/1997 |
| JP | 09-317784 | 12/1997 |
| JP | 10-103365 | 4/1998 |
| JP | 3460107 | 4/1998 |
| JP | 10-148216 | 6/1998 |
| JP | 2002-317823 | 10/2002 |

(Continued)

OTHER PUBLICATIONS

Universal Joint and Driveshaft Design Manual, AE-7, Warrendale, PA, Society of Automotive Engineers, Inc., pp. 145-150. TJ1079.S62 1979.*

(Continued)

*Primary Examiner* — Gregory Binda
(74) *Attorney, Agent, or Firm* — Wenderoth, Lind & Ponack, L.L.P.

(57) ABSTRACT

A fixed constant velocity universal joint includes an outer race having a spherical inner circumferential surface, the outer race including axially extending ball grooves formed in the spherical inner circumferential surface at regular circumferential intervals, and an inner race having a spherical outer circumferential surface, the inner race including axially extending ball grooves formed in the spherical outer circumferential surface at regular circumferential intervals. Balls are interposed between pairs of the ball grooves of the outer race and the ball grooves of the inner race. A cage has pockets for receiving the balls, the pockets being formed at predetermined circumferential intervals. The outer race is produced by hot forging or lathe-turning and subjected to thermal refining treatment.

14 Claims, 4 Drawing Sheets

FOREIGN PATENT DOCUMENTS

| | | |
|---|---|---|
| JP | 2005-060724 | 3/2005 |
| JP | 2007-107695 | 4/2007 |

OTHER PUBLICATIONS

Machinery's Handbook, 25th ed., New York, International Press, pp. 496, 497, 526 & 527. TJ151.M3 1996.*

International Preliminary Report on Patentability and Written Opinion of the International Searching Authority issued Dec. 17, 2009 in International (PCT) Application No. PCT/JP2008/059922 of which the present application is the U.S. National Stage.

International Search Report issued Jul. 1, 2008 in International (PCT) Application No. PCT/JP2008/059922.

* cited by examiner

FIXED CONSTANT VELOCITY UNIVERSAL JOINT AND METHOD FOR MANUFACTURING OUTER RACE THEREOF

TECHNICAL FIELD

This invention relates to a fixed constant velocity universal joint and to a method for manufacturing the outer race thereof. The universal joint can be used in power transmission devices for automobiles and various industrial machines.

BACKGROUND ART

Constant velocity universal joints used in power transmission devices for automobiles and various industrial machines can be broadly classified into fixed type and plunging type. Plunging constant velocity universal joints allow not only angular displacement but also axial displacement (plunging). However, fixed constant velocity universal joints allow only angular displacement and are used, for example, on the wheel side (outboard side) of the drive shafts of automobiles.

The reduction in size and weight of fixed constant velocity universal joints contributes to an improvement in fuel economy of automobiles and to an increase in flexibility of the layout of the driving systems. Therefore, it is desirable that fixed constant velocity universal joints be reduced in size as much as possible while satisfying the required performance. As shown in FIGS. 2 to 4, a fixed constant velocity universal joint includes, among others, an outer race 10, an inner race 20, balls 30, and a cage 40. To reduce the size and weight of the joint as a whole, Patent Documents 1 and 2, for example, propose that each component is reduced in size and weight. FIG. 3 shows a fixed constant velocity universal joint that is reduced in size and weight as compared with a fixed constant velocity universal joint shown in FIG. 2.

[Patent Document 1] Japanese Patent No. 3460107.
[Patent Document 2] Japanese Patent Application Laid-Open No. Hei 09-317784.

SUMMARY OF THE INVENTION

Problems to be Solved by the Invention

Generally, in terms of cost, the outer race of a conventional fixed constant velocity universal joint is produced by cold forging. Medium carbon steel for mechanical structures is often used as the material for the outer race because of its easy forgeability, machinability, heat treatment properties, economy, strength, and the like.

The shapes of the outer races of fixed constant velocity universal joints used in drive shafts of automobiles are different depending on the types of automobiles. In consideration of cost of cold forging (costs of molds and forging facilities), although it depends on the production volume of joints, the joints are sometimes produced by hot forging that allows the common use of several types of outer race shapes and sometimes produced by turning bar-shaped materials such as round steel bars with a lathe.

When the size and weight of a fixed constant velocity universal joint are reduced, the thickness of the outer race is accordingly reduced. Therefore, the mechanical strength of the outer race itself approaches the fatigue limit of medium carbon steel being a raw material, and a further reduction in size and weight is difficult.

When a product produced by hot forging or lathe-turning is used as the outer race of a fixed constant velocity universal joint having a reduced size, strength evaluation of this fixed constant velocity universal joint shows that the strength tends to be slightly lower than the strength when a cold forged product is used. The reason may be as follows: The cold forged product has a fine structure due to the influence of cold working, and work hardening causes the hardness of the material to increase. In addition, the metal flow is not broken. Therefore, the tensile strength of the outer race material is improved, and the strength thereof is greater than those of hot forged products and lathe-turned products produced from round rods.

When torque is inputted to a fixed constant velocity universal joint operated at an operating angle, the load applied to tracks varies depending on phase. FIG. 5 shows the relationship between the phase angle and the track load when the number of balls is 6. The same tendency is basically observed even when the number of balls is changed, and the load on the tracks increases as the operating angle increases. Therefore, when a large torque is instantaneously inputted, the tracks each receive a relatively uniform torque when the operating angle is small. However, when the operating angle is large, the torques are largely different for the tracks.

Since stress is concentrated on a track that receives a large load, an improvement in the tensile strength of the material improves the strength. When the operating angle is large and torque is inputted for a long period of time to cause rotation, the tracks each receive a large torque at some phases but do not receive such a large torque at some other phases. The stress caused by the changes in torque causes the outer race to be deformed repeatedly, resulting in fatigue fracture.

Accordingly, it is an object of this invention to impart, to the outer race of a fixed constant velocity universal joint that is produced by hot forging or lathe-turning, a strength equal to or greater than that of cold forged products, without changing the shape of the outer race.

Means for Solving the Problems

A fixed constant velocity universal joint of this invention has: an outer race having a spherical inner circumferential surface, the outer race including axially extending ball grooves formed in the spherical inner circumferential surface at regular circumferential intervals; an inner race having a spherical outer circumferential surface, the inner race including axially extending ball grooves formed in the spherical outer circumferential surface at regular circumferential intervals; balls interposed between pairs of the ball grooves of the outer race and the ball grooves of the inner race; and a cage having pockets for receiving the balls, the pockets being formed at predetermined circumferential intervals, wherein the outer race is produced by hot forging and subjected to thermal refining treatment.

Another fixed constant velocity universal joint of this invention has: an outer race having a spherical inner circumferential surface, the outer race including axially extending ball grooves formed in the spherical inner circumferential surface at regular circumferential intervals; an inner race having a spherical outer circumferential surface, the inner race including axially extending ball grooves formed in the spherical outer circumferential surface at regular circumferential intervals; balls interposed between pairs of the ball grooves of the outer race and the ball grooves of the inner race; and a cage having pockets for receiving the balls, the pockets being formed at predetermined circumferential intervals, wherein the outer race is produced by lathe-turning a steel bar and subjected to thermal refining treatment.

Preferably, a core portion of the outer race having been subjected to thermal refining treatment may have a hardness HV of 270 to 350. When the hardness HV of the core portion is less than 270, the strength is lower than that of a cold forged product. When the hardness HV is greater than 350, the strength is high, but disadvantageously, the degree of heat deformation increases. The fine structure and the increase in hardness of the material improve the fatigue strength of the fixed constant velocity universal joint. The thermal refining treatment is performed to improve the hardness of the material for the hot-forged outer race or lathe-turned outer race and to obtain a fine structure. In addition, the structure of the core portion is transformed into fine troostite or sorbite to increase the hardness of the material.

The core portion of the outer race is a portion other than hardened surface layers formed in the inner circumferential surface, the ball grooves and a stem portion of the outer race. The ball grooves serve as the raceway surfaces for the balls. The inner circumferential surface comes into spherical contact with the cage, and the stem portion makes a serration (or spline, hereinafter the same applies) fit. Therefore, a hardened surface layer is formed in each of the above portions by heat treatment including, for example, induction quenching-tempering.

The thermal refining treatment is a kind of tempering, and a desired tempered structure is obtained by heating at 800 to 900° C., quenching, and re-heating at 450 to 650° C. (claim 4). More specifically, when the metal structure of iron is transformed into sorbite or troostite by thermal refining treatment, the metal structure of iron must be first transformed into martensite. Therefore, heating at 800 to 900° C., where martensitic transformation occurs, is performed. After quenching and tempering, air cooling from 450 to 650° C. is performed to form the sorbite structure.

Since the above-described heating treatment is performed, it is preferable that medium carbon steel containing carbon in an amount of 0.40 to 0.60 percent by weight be used as the material for the outer race. This range of the carbon amount corresponds to S48C to S55C mechanical structural carbon steel generally used in constant velocity universal joints. When the amount of carbon is less than this range, a portion required to have a sufficient hardness is not sufficiently quenched. When the amount of carbon is greater than this range, molding properties and workability during forging are impaired, and this is likely to cause an increase in cost and the occurrence of machining failure.

Effects of the Invention

In this invention, the structure of the core portion (a portion not subjected to induction heat treatment) of the outer race having been subjected to thermal refining treatment is transformed into a fine troostite or sorbite structure, and the hardness of the core portion is improved.

Therefore, the tensile strength of the core portion of the outer race is improved, and the fracture strength is increased. Moreover, even when cyclic stress is applied, the fine structure and the increase in strength of the core lo portion improve the fatigue strength. As described above, the obtained strength is equivalent to the strength of a fixed constant velocity universal joint using an outer race produced by cold forging. Therefore, this invention is particularly suitable for fixed constant velocity universal joints including outer races that must be produced by hot forging or lathe-turning because of their small production volume when cost is taken into consideration and for fixed constant velocity universal joints including outer races that are difficult to be produced by cold forging because of their complicated shapes and can be produced only by hot forging or lathe-turning.

LIST OF REFERENCE NUMERALS

Figure 1:
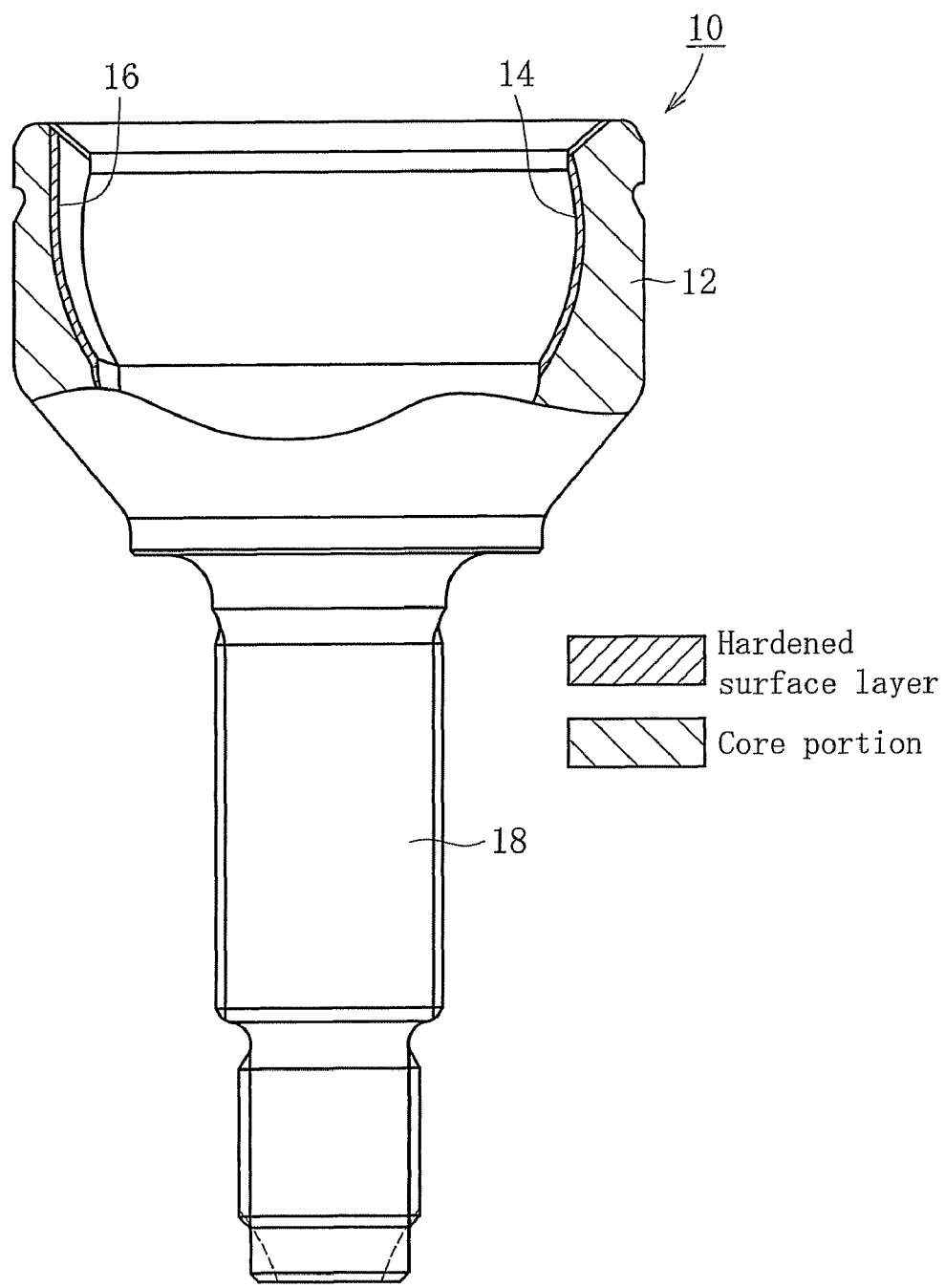
FIG. 1 is a partially fragmented front view of the outer race of a fixed constant velocity universal joint.

10 outer race (outer joint member)
12 mouth portion
14 inner circumferential surface
16 ball groove
18 stem portion
20 inner race (inner joint member)
22 serration hole
24 outer circumferential surface
26 ball groove
30 ball (torque transmission element)
40 cage
42 outer circumferential surface
44 inner circumferential surface
46 pocket

DETAILED DESCRIPTION OF THE INVENTION

Figure 2:
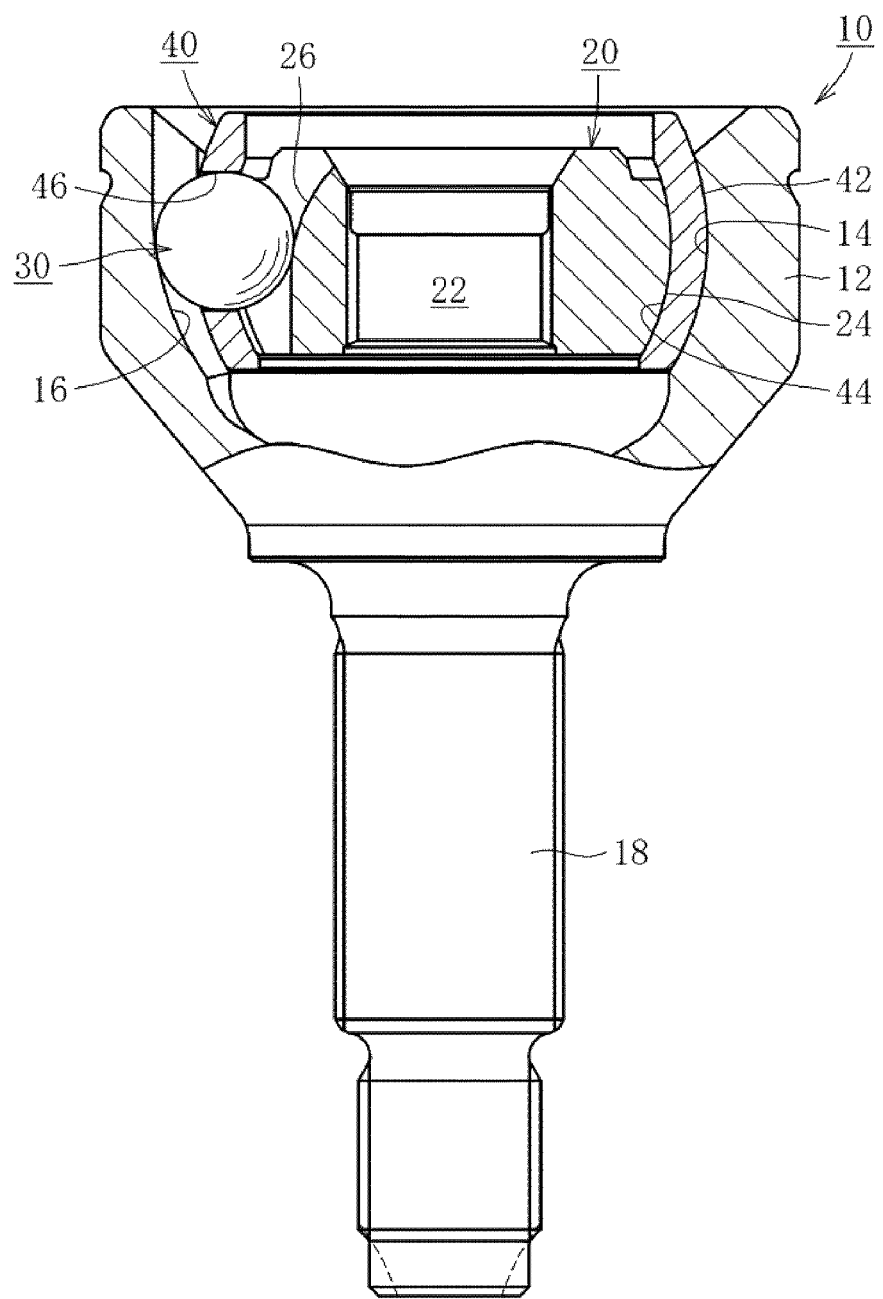
FIG. 2 is a longitudinal cross-sectional view of a general fixed constant velocity universal joint.
Figure 3:
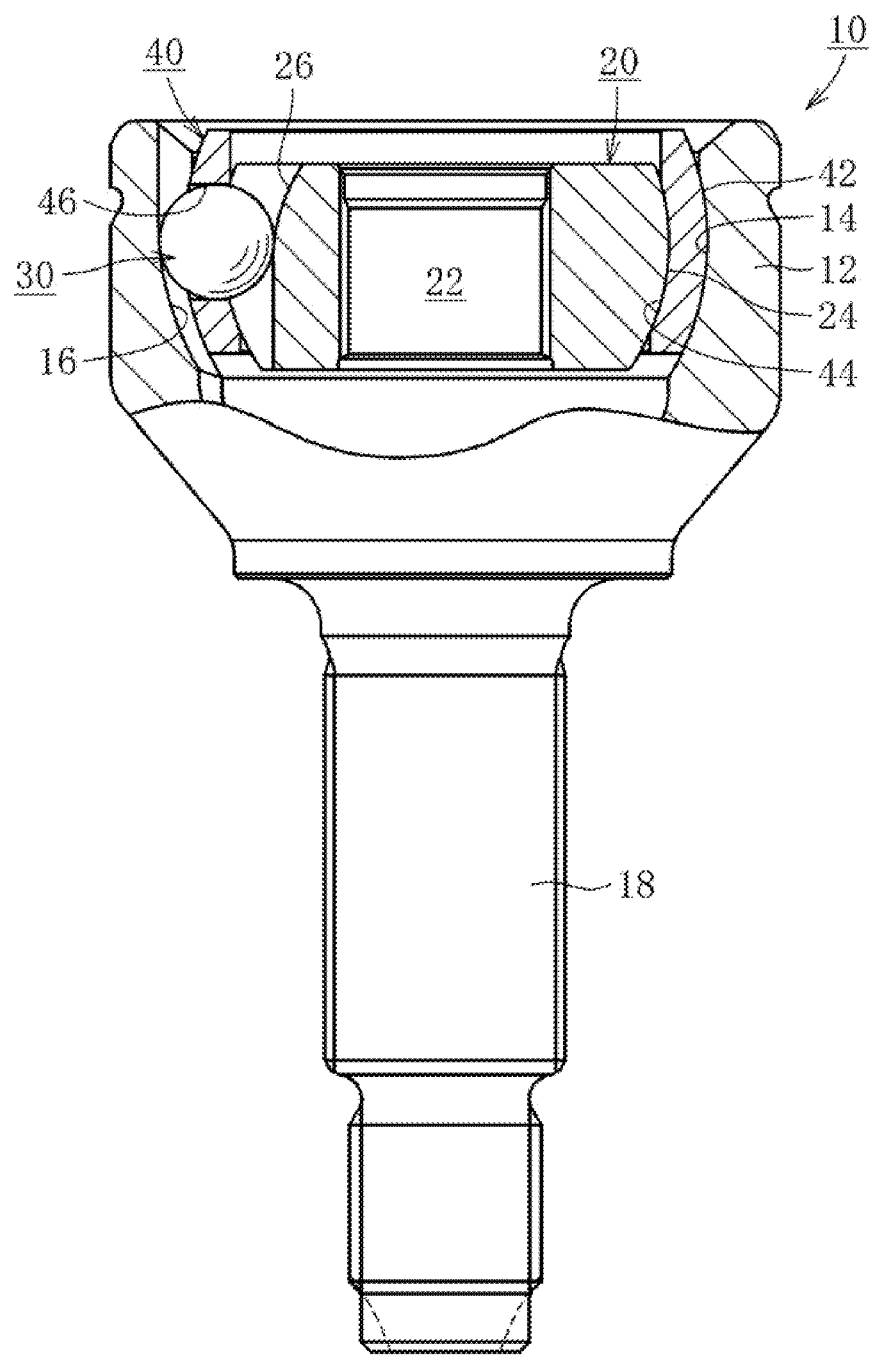
FIG. 3 is a longitudinal cross-sectional view of a fixed constant velocity universal joint with a reduced size.
Figure 4:
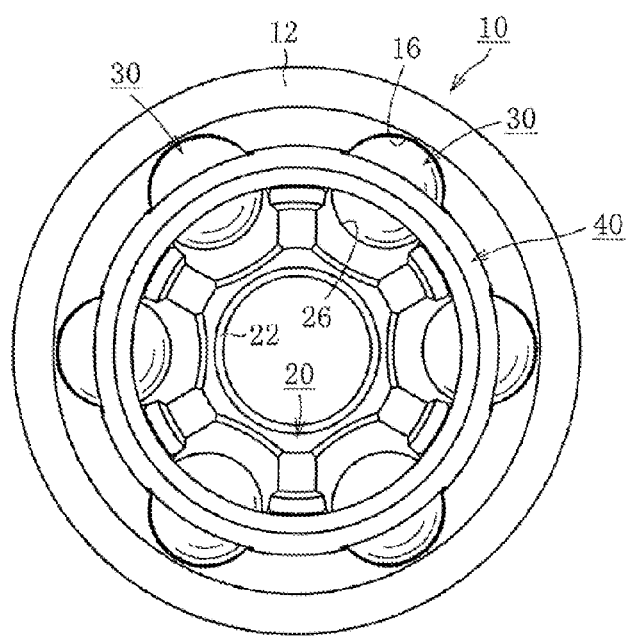
FIG. 4 is an end view of the fixed constant velocity universal joint.
Figure 5:
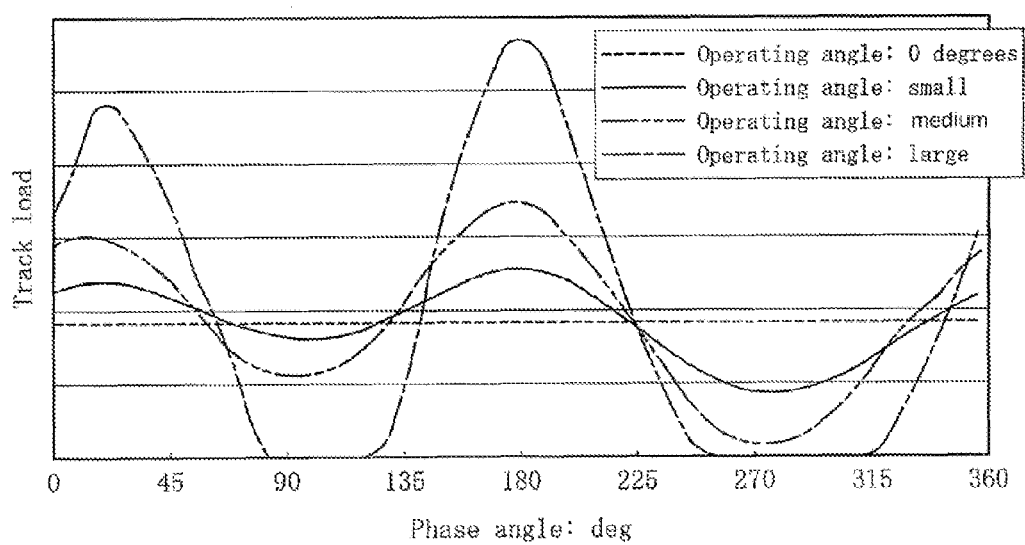
FIG. 5 is a graph showing the relationship between a phase angle and a track load.

Hereinafter, embodiments of this invention will be described with reference to the drawings. First, a description is given of the basic structure of a fixed constant velocity universal joint. As shown in FIGS. 2 to 4, the fixed constant velocity universal joint includes, among others: an outer race 10 serving as an outer joint member; an inner race 20 serving as an inner joint member; balls 30 serving as torque transmission elements; and a cage 40 that holds the balls.

The outer race 10 includes a mouth portion 12 and a stem portion 18. The serration shaft portion of the stem portion 18 is to be connected to one of two connection shafts in a torque transmittable manner. The mouth portion 12 is of the bell type and has a spherical inner circumferential surface 14, and axially extending ball grooves 16 are formed at regular intervals in the circumferential direction of the spherical inner circumferential surface 14.

The inner race 20 is to be connected, in a torque transmittable manner, to the other one of the two shafts at a serration hole 22 formed in the shaft center portion. The inner race 20 has a spherical outer circumferential surface 24, and axially extending ball grooves 26 are formed at regular intervals in the circumferential direction of the spherical outer circumferential surface 24.

The ball grooves 16 of the outer race 10 are paired with the ball grooves 26 of the inner race 20, and one ball 30 is installed between each pair of the ball grooves 16 and 26. All the balls 30 are held by the cage 40 in the same plane. Generally, six or eight balls 30 are used, but no particular limitation is imposed on the number of balls.

The cage 40 is interposed between the inner circumferential surface 14 of the outer race 10 and the outer circumferential surface 24 of the inner race 20. An outer circumferential surface 42 of the cage 40 comes into spherical contact with the inner circumferential surface 14 of the outer race 10, and an inner circumferential surface 44 of the cage 40 comes into spherical contact with the outer circumferential surface 24 of the inner race 20. The cage 40 has pockets 46 for receiving the balls 30, and the pockets 46 are formed at predetermined circumferential intervals.

The centers of the ball grooves 16 of the outer race 10 and the centers of the ball grooves 26 of the inner race 20 are axially offset from the center of the joint by an equal distance in opposite directions. Therefore, a track formed by each pair of the ball groove 16 of the outer race 10 and the ball groove 26 of the inner race 20 forms a wedge-like shape having a width decreasing in a direction from one axial end to the other axial end. When the joint is operated at an operating angle, the balls 30 are held in a plane bisecting the two shafts, and the lengths of the normals from the center of each ball 30 to the axes of the shafts are equal. Therefore, the two shafts are rotated always at a constant angular velocity.

Medium carbon steel containing carbon in an amount of 0.40 to 0.60 percent by weight is used as the material for the outer race 10, and hot forging or lathe-turning is used as a method for producing the outer race 10. In both cases, the inner circumferential surface 14, the ball grooves 16, and the stem portion 18 are subjected to induction heat treatment including ordinary induction quenching-tempering to form hardened surface layers. The ball grooves 16 serve as raceway surfaces for the balls 30. The inner circumferential surface 14 serves as a spherical fitting portion fitted with the cage 40, and the stem portion 18 serves as a spline fitting portion fitted with a hub ring. Therefore, the induction heat treatment is performed to ensure rolling durability of the raceway surfaces, scratch durability of the cage fitting portion, strength and durability of the spline fit, and stem strength.

Before the induction heat treatment, thermal refining treatment described later is performed. A portion having no hardened surface layer formed therein is referred to as a core portion. FIG. 1 is a partially fragmented view of the outer race 10. Parallel oblique lines with narrow spacings represent the hardened surface layer, and parallel oblique lines with wide spacings represent the core portion.

When hot forging is used, no additional treatment is generally performed after forging. However, when high machining accuracy is required, lathe-turning may be further performed. The lathe-turning is performed after the thermal refining treatment. However, the lathe-turning may be performed before the thermal refining treatment, in consideration of ease of machining.

The core portion of an outer race produced by cold forging has a Vickers hardness HV of about 270 to about 340. However, the core portion of an outer race produced by hot forging or lather-turning has a Vickers hardness HV of about 180 to about 250. Therefore, thermal refining treatment is performed to increase the hardness HV of the core portion to, for example, 270 to 350, which is equal to or greater than that of the cold forged outer race. The thermal refining treatment causes the structure of the core portion of the outer race 10 to change from an ordinary structure containing ferrite to a troostite or sorbite structure. A fine structure is thereby obtained, and the hardness is improved.

The thermal refining treatment is a kind of tempering, and a desired tempered structure is obtained by heating at 800 to 900° C., quenching, and re-heating at 450 to 650° C. (tempering). A specific example of the thermal refining treatment is as follows: Quenching is performed using a cooling liquid (for example, COSMO QUENCH A212) after heating in a batch-type quenching furnace at a quenching temperature of about 850° C. for about 1.5 hours. The carbon potential CP in the furnace atmosphere is 0.5%. Tempering is performed by heating in a tempering furnace at a tempering temperature of 500 to 550° C. for about 2 hours, and then air cooling is performed.

The structure of the thermal-refined outer race 10 is troostite or sorbite, and a fine structure is obtained. Moreover, since the hardness is improved, the tensile strength of the outer race 10 is improved, and the fracture strength is increased. In addition, the improvement in strength and the fine structure improve the fatigue strength under cyclic stress.

The thermal-refined outer race 10 is subjected to induction heat treatment. More specifically, the hardened surface layers are formed partially in the inner circumferential surface 14 to be in contact with the cage 40, the ball grooves 16 to be in contact with the balls 30, and the stem portion 18, as described above.

A description has been given of the outer race of the fixed constant velocity universal joint that is produced by hot forging or lathe-turning. Next, a description is given of the outer race of a fixed constant velocity universal joint that is produced by cold forging.

The following proposals have conventionally been made to reduce the weight of a fixed constant velocity universal joint while the performance thereof is maintained.
(1) Use of a special material to improve fatigue strength (Japanese Patent Application Laid-Open No. 2005-60724).
(2) Improvement of fatigue strength by shot peening (Japanese Patent Application Laid-Open No. Hei 04-194418).
(3) Improvement of dimensional accuracy after cold forging and uniformity of heat treatment by performing thermal refining treatment before cold working to homogenize the material structure. The thermal refining treatment effectively improves fracture ductility, yield strength, and toughness (Japanese Patent Application Laid-Open No. Hei 10-148216).

In the above proposal (1), a special material is used to improve the strength. Therefore, the procurement of the special material is difficult when manufacturing facilities are located worldwide. Moreover, an alloy is added to the material. This results in an increase in material cost, deterioration of workability of cold forging and machinability, a reduction in mold life and tool life, and an increase in manufacturing cost.

In proposal (2), shot peening is additionally performed. This results in an increase in the number of steps, and the manufacturing cost is increased. Proposal (2) is effective for fatigue strength but does not improve fracture ductility. Therefore, when the size of a joint is reduced and the thickness is thereby reduced, static fracture strength is not improved.

In proposal (3), the hardness improved by thermal refining treatment performed after sub-hot forging may possibly result in a reduction in mold life in cold forging and forging-molding cracks.

Accordingly, a proposal is made to further reduce the size and weight of a fixed constant velocity universal joint while the basic performance thereof is maintained. Specifically, the outer race of the fixed constant velocity universal joint is produced by pre-forming a product having substantially predetermined dimensions from a steel material by sub-hot or warm forging, subjecting the preformed product to finishing forming by cold forging, and then performing thermal refining treatment.

The core portion of the thermal-refined outer race has a troostite or sorbite structure containing spherical carbides.

This structure is finer than the ferrite-pearlite structure of the material before thermal refining treatment, and the hardness is increased. Therefore, the tensile strength of the outer race is improved, and the fracture strength is improved. Even when cyclic stress is applied, the fine structure and the increase in strength of the core portion improve the fatigue strength. As a result of the improvement in the strength of the outer race, the thickness of the outer race can be further reduced as compared with that of a cold forged outer race, and the size and weight can be further reduced as compared with those of a conventional fixed constant velocity universal joint.

Preferably, the Vickers hardness HV of the core portion of the outer race after the thermal refining may be 320 or more. When the thermal refining is performed before cold forging, the material becomes hard. This may possibly result in forging mold life and molding cracks. However, when the thermal refining treatment is performed after cold forging, cold forging conventionally used can be performed, and a facility configured in consideration of mold life and the use of a different mold are not required.

The structure of the outer race can also be described with reference to FIG. 1. Medium carbon steel containing carbon in an amount of 0.40 to 0.60 percent by weight is used as the material for the outer race 10, and hot forging or lathe-turning is used as a method for producing the outer race 10. The spherical inner circumferential surface 14, the ball grooves 16, and the stem portion 18 are subjected to induction heat treatment including ordinary induction quenching-tempering to form hardened surface layers. The inner circumferential surface 14 serves as a spherical fitting portion to be fitted with the cage 40. The ball grooves 16 serve as raceway surfaces for the balls 30, and the stem portion 18 serves as a spline fitting portion to be fitted with a hub ring. Therefore, these parts are subjected to induction heat treatment to form martensite as the main structure. This ensures rolling durability of the raceway surfaces, scratch durability of the cage fitting portion, strength and durability of the spline fit, and stem strength.

Before the induction heat treatment, thermal refining treatment described later is performed. Also in this case, a portion having no hardened surface layer formed therein is referred to as a core portion. When cold forging is used, no additional treatment is generally performed after forging. However, if high machining accuracy is required, lathe-turning may be further performed. The thermal refining treatment may be performed before the lathe-turning or after the lathe-turning, in consideration of ease of machining.

The thermal refining treatment causes the structure of the outer race 10 to change from an ordinary structure containing ferrite to the troostite or sorbite structure. A fine structure is thereby obtained, and the hardness is improved. More specifically, the Vickers hardness HV of the outer race produced by cold forging is about 270 to about 340. However, the thermal refining treatment improves the hardness to 320 or more.

As described above, the thermal refining treatment is a kind of tempering, and a desired tempered structure is obtained by heating at 800 to 900° C., quenching, and re-heating at 450 to 650° C. (tempering). A specific example of the thermal refining treatment is as follows: Quenching is performed using a cooling liquid (for example, COSMO QUENCH A212) after heating in a batch-type quenching furnace at a quenching temperature of about 850° C. for about 1.5 hours. The carbon potential CP in the furnace atmosphere is 0.5%. Tempering is performed by heating in a tempering furnace at a tempering temperature of 500 to 550° C. for about 2 hours, and then air cooling is performed.

The structure of the thermal-refined outer race 10 is troostite or sorbite, and a fine structure is obtained. Moreover, since the hardness is improved, the tensile strength of the outer race 10 is improved, and the fracture strength is increased. In addition, the improvement in strength and the fine structure improve the fatigue strength under cyclic stress.

The thermal-refined outer race 10 is subjected to induction heat treatment. More specifically, the inner circumferential surface 14 to be in contact with the cage 40, the ball grooves 16 to be in contact with the balls 30, and the stem portion 18 are partially subjected to induction heat treatment to form hardened surface layers composed of a martensite structure, as described above.

The undercut free constant velocity universal joint (UJ) has been illustrated and described as an example. However, this invention is applicable to other fixed constant velocity universal joints such as the Birfield-type, as well.

The invention claimed is:

1. A method for producing an outer race of a fixed constant velocity universal joint, the method comprising:
    forming the outer race by forging a steel material to include a spherical inner circumferential surface and axially extending ball grooves formed in the spherical inner circumferential surface at regular circumferential intervals; and
    subjecting the outer race to thermal refining treatment at a quenching temperature of 800 to 900° C. and at a tempering temperature of 450 to 650° C.

2. A method as claimed in claim 1, wherein the outer race includes a core portion having a hardness HV of 270 to 350.

3. A method as claimed in claim 2, wherein the steel material of the outer race is medium carbon steel containing carbon in an amount of 0.40 to 0.60 percent by weight.

4. A method as claimed in claim 3, wherein a hardened surface layer is locally formed in the spherical inner circumferential surface and the axially extending ball grooves, and a stem portion of the outer race.

5. A method as claimed in claim 2, wherein a hardened surface layer is locally formed in the spherical inner circumferential surface and the axially extending ball grooves, and a stem portion of the outer race.

6. A method as claimed in claim 1, wherein the steel material of the outer race is medium carbon steel containing carbon in an amount of 0.40 to 0.60 percent by weight.

7. A method as claimed in claim 6, wherein a hardened surface layer is locally formed in the spherical inner circumferential surface and the axially extending ball grooves, and a stem portion of the outer race.

8. A method as claimed in claim 1, wherein a hardened surface layer is locally formed in the spherical inner circumferential surface and the axially extending ball grooves, and a stem portion of the outer race.

9. A method for producing an outer race of a fixed constant velocity universal joint, the method comprising:
    forming the outer race by lathe-turning a steel material to include a spherical inner circumferential surface and axially extending ball grooves formed in the spherical inner circumferential surface at regular circumferential intervals; and
    subjecting the outer race to thermal refining treatment at a quenching temperature of 800 to 900° C. and at a tempering temperature of 450 to 650° C.

10. A method as claimed in claim 9, wherein the outer race includes a core portion having a hardness HV of 270 to 350.

11. A method as claimed in claim 10, wherein the steel material of the outer race is medium carbon steel containing carbon in an amount of 0.40 to 0.60 percent by weight.

12. A method as claimed in claim 9, wherein the steel material of the outer race is medium carbon steel containing carbon in an amount of 0.40 to 0.60 percent by weight.

13. A method as claimed in claim 12, wherein a hardened surface layer is locally formed in the spherical inner circumferential surface and the axially extending ball grooves, and a stem portion of the outer race.

14. A method as claimed in claim 9, wherein a hardened surface layer is locally formed in the spherical inner circumferential surface and the axially extending ball grooves, and a stem portion of the outer race.

* * * * *